(12) United States Patent
Bennett, Jr. et al.

(10) Patent No.: US 6,229,448 B1
(45) Date of Patent: May 8, 2001

(54) INTRINSICALLY SAFE FLUID TANK OVERFILL PROTECTION SYSTEM

(75) Inventors: Paul R. Bennett, Jr., Houston; J. Lawrence Taylor, III, Katy, both of TX (US)

(73) Assignee: Innovative Sensor Solutions, Ltd., Houston, TX (US)

( * ) Notice: Subject to any disclaimer, the term of this patent is extended or adjusted under 35 U.S.C. 154(b) by 0 days.

(21) Appl. No.: 09/541,353

(22) Filed: Mar. 31, 2000

Related U.S. Application Data
(60) Provisional application No. 60/128,868, filed on Apr. 12, 1999.

(51) Int. Cl.[7] .................................................. G08B 21/00
(52) U.S. Cl. ........................ 340/618; 340/623; 340/624; 73/305; 73/307
(58) Field of Search ................................. 340/618, 623, 340/624; 73/290 R, 305, 306, 307

(56) References Cited

U.S. PATENT DOCUMENTS

| | | |
|---|---|---|
| 4,369,437 | 1/1983 | Thompson, Jr. et al. ............ 340/539 |
| 4,459,584 | 7/1984 | Clarkson ............................... 340/624 |
| 5,363,093 * | 11/1994 | Williams et al. ...................... 340/605 |
| 5,642,097 * | 6/1997 | Martel ................................... 340/618 |
| 5,708,424 * | 1/1998 | Orlando et al. .................. 340/870.08 |
| 5,762,118 * | 6/1998 | Epworth et al. ...................... 340/450 |
| 5,946,084 | 8/1999 | Kubulins ............................... 356/128 |

* cited by examiner

*Primary Examiner*—Edward Lefkowitz
(74) *Attorney, Agent, or Firm*—Bracewell & Patterson, L.L

(57) ABSTRACT

A tank level monitoring and alarm system comprises a passive level switch, a transmitter, a repeater, and a receiver. It provides easy installation, convenient calibration, and very low maintenance. A mechanical level switch for the specific vessel is installed. The contacts of the level switch are connected to the transmitter. When the switch is activated, the transmitter immediately broadcasts an alarm signal to the receiver. A relay output at the receiver is either opened or closed thus activating the alarm or other device attached to it. The relay output may also connect to a control apparatus, such as a signal transmitter to provide for remote operation of such devices as valves.

21 Claims, 1 Drawing Sheet

INTRINSICALLY SAFE FLUID TANK OVERFILL PROTECTION SYSTEM

This application claims the benefit of U.S. Provisional Application No. 60/128,868, filed Apr. 12, 1999.

FIELD OF THE INVENTION

The present invention relates generally to the field of storage tank fluid systems and, more particularly, to an intrinsically safe wireless overfill protection system for storage tanks.

BACKGROUND OF THE INVENTION

Industry and safety standards require that liquid storage tanks of the type located on petroleum tank farms be given periodic checks to determine the liquid level of each tank. Level indicators for such tanks typically comprise a tape and pulley apparatus with a float at one end of the tape within the tank and a mechanical level indicator at the other end.

This typical arrangement was improved on by Clarkson, U.S. Pat. No. 4,459,584 to include a transmitter for remote monitoring of liquid level, but the Clarkson system still required the use of the old tape and pulley system to monitor liquid level. This system suffered all of the common problems with the tape and pulley system in that such a system may mechanically jam, thereby disabling the movement of the float. Further, a large volume of volatile gases fills the conduit enclosing the tape and pulley, since this system is open to the tank. This feature alone presents a significant safety hazard. Further, the Clarkson system provides no means for calibration of the level detector, since it relies upon the old tape and pulley system.

We began the development of the present invention with a level monitoring and alarm system sold under the trademark Fillcheck®. This system included a transmitter that was mounted in an off-the-shelf NEMA-7 explosion-proof enclosure so as to enable it to be used in the electrically hazardous environments associated with petroleum storage tanks, pipelines, oil refineries, petrochemical plants, and fuel terminals. This type of mounting solved the problems described with regard to Clarkson, but it brought about certain shortcomings, such as the attenuation of the level signal. Mounting the transmitter and its antenna inside the explosion-proof enclosure significantly reduced the system's effective range. In this system, the explosion-proof transmitter had to be aimed toward its receiver or repeater for optimum performance. Further, that system was expensive, and the transmitter had to be equipped with a safety barrier so as to permit its connection to an external level switch, which added to system cost. That system was also heavy, in that explosion-proof enclosures are quite massive and add significantly to shipping and handling costs. Finally, explosion-proof enclosures are typically constructed of aluminum which is prone to pitting and corrosion, known as exfoliation, particularly when used in marine or coastal environments in which many refining and petrochemical facilities are located.

Thus, there remains a need for a tank level monitoring and alarm system which is intrinsically safe, minimizes the number of moving parts, and seals volatile gases within the storage tank. The present invention addresses this need in the art.

SUMMARY OF THE INVENTION

The system of this invention comprises four components: (1) a passive level switch or other passive sensor; (2) a transmitter; (3) a repeater (if required); and (4) a receiver. It provides easy installation, convenient calibration, and very low maintenance. It is specifically designed to provide fail-safe overfill protection for vessels where electrical power and/or alarm signal wiring to a supervised point are not available. Further, it is easily adapted to most systems which can include a passive sensor which provides an analog signal which is then transmitted by the system of this invention to a central monitor.

In a preferred embodiment of the invention, a mechanical level switch of appropriate design for the specific vessel is installed. The contacts of the level switch are connected to the intrinsically safe transmitter. When the switch is activated, the transmitter immediately broadcasts an alarm signal to the receiver. A relay output at the receiver is either opened or closed thus activating the alarm or other device attached to it. The relay output may also connect to a control apparatus, such as a signal transmitter to provide for remote operation of such devices as valves.

The level switch and transmitter package are powered by a secondary battery, such as for example a D cell size 3.6V lithium thionyl chloride battery. During non-alarm conditions, a supervisory signal is transmitted every 30 seconds which contains the transmitter identification and battery condition. It the receiver fails to hear from any of its transmitters, an inactive alarm is issued. Also, low battery alarms are issued before a transmitter's battery dies.

Any type of passive switching device that provides either normally open or normally closed contacts can be used with this embodiment of the invention. Further, the system of this invention is adaptable to virtually any type of passive switch or sensor which senses a parameter of interest. For storage vessels without floating roofs, a magnetic reed float switch can be used. These devices can be constructed of stainless steel, brass, or polypropylene. These float switches are available in either vertical or horizontal configurations, and can be made to virtually any length. Vertical models can optionally be equipped with a positive checking feature that enables the operator to magnetically lift the float without removing the assembly from the vessel.

The system of the present invention provides reliable, low cost, wireless overfill or other out of specification condition protection. Many areas now require overfill protection systems that operate redundantly of existing tank gauging devices. Thus, this system provides continuous fully supervised protection against conditions which routinely require monitoring. It includes a battery powered transmitter, so it needs no external electrical power at the storage tank. The transmitter is intrinsically safe (Class I Division 1 Groups C&D), and requires no FCC licensing. It has low installation and maintenance costs, and the alarms are provided with fail-safe aspects for increased reliability.

DETAILED DESCRIPTION OF PREFERRED EMBODIMENTS

Figure 1:
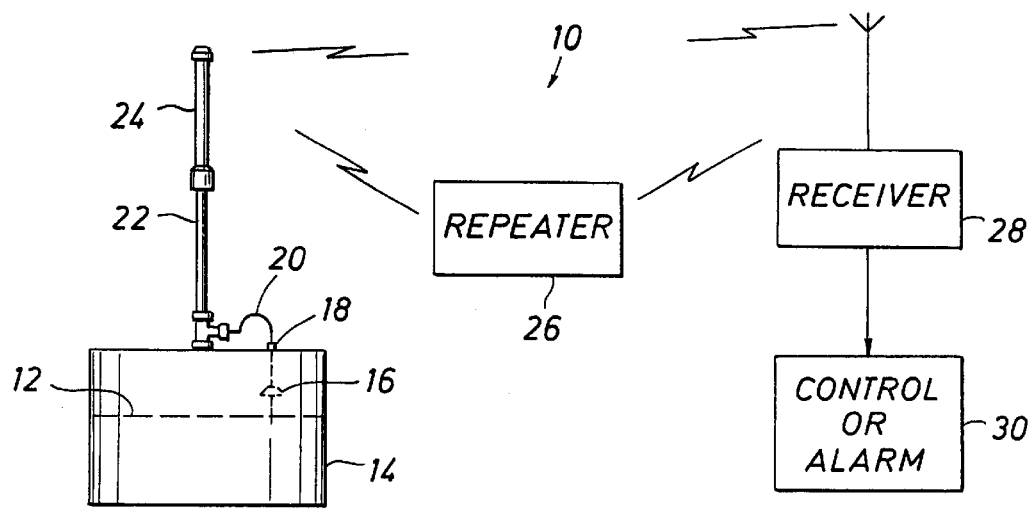
FIG. 1 is an overall schematic diagram of the level monitoring and alarm system of this invention.

FIG. 1 shows the level monitoring and alarm system 10 of this invention. The system monitors the fluid level 12 in a storage tank 14. The fluid level is detected by a passive level sensor 16 which moves vertically with fluid level 12. At a predetermined level of fluid within the tank 14, a passive level switch 18 is shut (or open). The switch 18 may be a displacement type switch or a weight switch when used on a tank with a floating roof, or a float switch when used on tanks without a floating roof. The level switch 18 is coupled by a wire 20 to the interior of a mast 22, which supports a transmitter module 24.

Upon activation, the transmitter module transmits a signal, either to an intermediate repeater 26, if required, or directly to a receiver 28. A repeater is required if the distance from the transmitter to the receiver is too great to transmit directly to the receiver, which may be located in a distant control room. In a preferred embodiment, the receiver may be dedicated to a specific transmitter, or the system can be configured so that a repeater boosts signals from transmitters and other repeaters. The repeater is preferably mounted within a Weatherproof nonmetallic (NEMA 4X) enclosure that can be purged for use in hazardous areas. It uses AC power, with an internal backup battery included to continue operation through power outages. The repeater may have a range of up to 3 km (line of sight). Additional repeaters can be used for greater distances or to clear obstructions.

A receiver may operate as a stand-alone unit (discrete) or with a computer interface (serial). Discrete receivers have indicator lights (not shown) for each relay showing which tanks are in alarm condition. Discrete receivers may have an LED display indicating exact tank location and type of fault(s). If the system operates with a computer interface, the receiver can monitor hundreds of transmitters. Preferably, receivers only "listen" for transmitters and repeaters programmed to them, and multiple receivers can be used for distributed control and adjacent or overlapping monitoring and alarm systems.

Once the receiver senses an alarm signal from the transmitter, the receiver activates a control or alarm module 30. The alarm may comprise a visible or audible alarm, or it may simply signal to an operator to cease whatever activity is going on which caused the out of specification condition at the tank. The receiver may also provide relay outputs which can be used to sound an alarm, shut off a pump, close a valve, activate a telephone auto-dialer or operate almost any other device.

It should be noted that the system of this invention is also adaptable to other applications where a passive switch can sense an out of specification condition. For example, certain systems require proper operation within a band of pressures, and such a system may include a passive switch for each of the upper and lower pressure settings. Such an application and others are within the scope and spirit of the present invention.

It is particularly noteworthy in the system shown in FIG. 1 that the system is intrinsically safe. No spark producing components are exposed to volatile gases, and such gases are retained entirely within the tank 14, unlike known systems. It should also be noted that the receiver 28 may be dedicated to many such tank monitoring systems, and may passively monitor all of the level monitoring systems assigned to it, or it may poll the various monitoring system for proper operation. Further, as shown in FIG. 1, the system is independent of external power requirements, and it is independent of communication wiring from the transmitter to the receiver.

Figure 2:
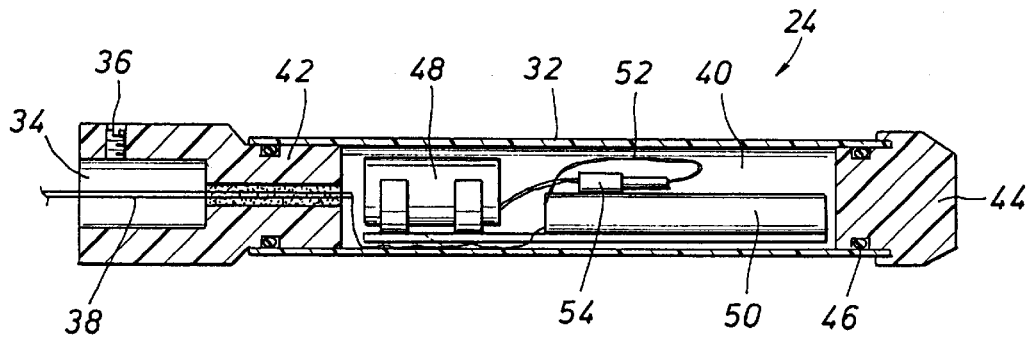
FIG. 2 is a detail cross-section view of the transmitter module of this invention.

Referring to FIG. 2, the transmitter module 24 includes a sealed outer shell 32, such as fiberglass or other durable, weather resistant material. The module 24 mounts onto the mast 22, such as for example with a cavity 34 to receive the top of the mast, and may be secured with a set screw 36. Also through the mast is a two-wire electrical conductor 38, which is coupled at the tank 14 to the level switch 18. When the level switch is shut, the two-wire conductor 38 completes the circuit to the transmitter as described below.

The conductor 38 is directed into a sealed chamber 40, which is sealed at the bottom with a bottom wall 42 and at the top with a top cap 44. The top of the chamber 40 is further sealed with an O-ring seal 46. The conductor 38 penetrates the bottom wall 42 through a stuffing tube, or is otherwise potted to seal the penetration with the wall 42.

The chamber 40 includes a battery 48 and a transmitter 50. The battery is preferably a secondary battery, such as a high capacity lithium-ion or lithium polymer battery, selected because of its high power density and long life. The system may also include a solar charging system (not shown) in order to extend the useful life of the battery even further between replacement and charging cycles. The battery is mounted into the module 24 with battery clips, and is electrically coupled to the transmitter 50 with wires 52 and a battery connector 54. The battery and transmitter 50 are preferably assembled as a unit onto a backbone 56, for ease of installation and maintenance.

The transmitter 50 is self-contained, intrinsically safe, and very reliable. Once the level switch 18 is shut, the transmitter sends a radio frequency signal, which includes a unique identifying code to distinguish the transmitter from any other transmitter included in the system 10. The onboard battery 48 (which also operates the level switch circuit) has a 2–3 year life, and provides fully supervised operation. A supervisory signal is transmitted every 30 seconds, which contains the transmitter's ID Code and battery condition. If the receiver fails to hear from any of its transmitters, an inactive alarm is issued by the transmitter 50. Also, low battery alarms may be issued about 30 days before a transmitter's battery dies.

The transmitter may comprise a 900 MHz spread spectrum device that contains an onboard processor and non-volatile ROM. The transmitter is enclosed in a fiberglass housing, and contains the following components as shown in the diagram below.

Figure 3:
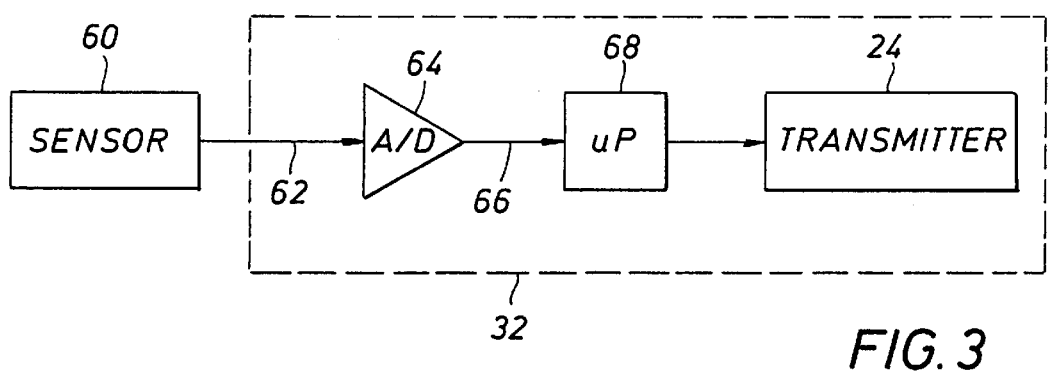
FIG. 3 is a schematic diagram of the invention adapted for use with a passive sensor.

Referring now to FIG. 3, an embodiment including this feature of the invention is disclosed. The transmitter module 24 includes the sealed outer shell 32 as previously described. In this case, a passive sensor 60, which may detect temperature, pressure, flow rate, density or opacity, or any other appropriate parameter which may vary over time, is placed where it is exposed to the parameter. The sensor provides an analog signal over a signal line 62 to an analog to digital (A/D) converter 64. The A/D converter digitizes the analog signal, and conducts that digital signal over a communication line 66 to a microprocessor 68. The microprocessor is programmed to monitor the incoming digital signal for a limit condition or a band or specific values. The digitized signal is processed by the microprocessor into a transmitter signal over a communication line 70, and the transmitter signal may be periodically transmitted by the transmitter 24 to periodic monitoring of the predetermined parameter, or the transmitter may only be activated if an out of specification condition develops.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A storage tank level monitoring and alarm system adapted for use in an electrically hazardous environment, the system comprising:
   a. a level sensor adapted to be mounted on a tank to sense the level of liquid in the tank, the sensor sealed from volatile gases, the sensor sealing gases within the tank;
   b. a switch mounted on a top surface of the tank, the switch coupled to the level sensor and adapted to change state at a predetermined level of liquid in the tank;
   c. an intrinsically safe, monitored transmitter module activated by the switch and adapted to transmit, upon activation, an alarm signal which uniquely identifies the tank being monitored;
   d. a receiver to monitor the transmitter module and to receive the alarm signal from the transmitter and to generate a response signal; and
   e. a responsive unit to receive the response signal from the receiver and to develop an action as a result of the response signal.

2. The system of claim 1, wherein the transmitter module includes a battery to operate the transmitter.

3. The system of claim 1, wherein the action comprises an alarm.

4. The system of claim 1, wherein the action comprises a control signal.

5. The system of claim 1, wherein the transmitter module is sealed within a weather resistant enclosure.

6. The system of claim 5, wherein the switch is coupled to the transmitter module by a wire which penetrates the enclosure.

7. The system of claim 5, wherein the top of the weather resistant enclosure comprises a top cap.

8. The system of claim 1, wherein the transmitter module is mounted atop the storage tank on a mast.

9. The system of claim 1, further comprising a repeater to receive a signal from the transmitter and to retransmit the signal to the receiver.

10. The system of claim 9, wherein the repeater is adapted to receive and distinguish signals from a plurality of transmitters.

11. The system of claim 1, wherein the transmitter periodically transmits a status signal indicative of the status of the system.

12. The system of claim 11, wherein the transmitter stays off unless it is transmitting an alarm signal or a status signal.

13. A method of monitoring the level in a storage tank adapted to hold flammable liquids and gases, comprising the steps of:
   a. mounting a switch on top of the storage tank;
   b. coupling the switch to a passive level sensor within the tank, the sensor sealed from flammable gases, the sensor sealing gases within the tank;
   c. coupling the switch to a battery powered transmitter mounted on the tank;
   d. installing a receiver to receive signals from the transmitter;
   e. upon sensing a predetermined liquid level by the sensor, sending an alarm signal from the transmitter to the receiver; and
   f. periodically transmitting a status signal from the transmitter to the receiver, the status signal indicative of the status of the switch, the sensor, and the transmitter.

14. The method of claim 13, further comprising the steps of
   a. receiving by a repeater the signal transmitted by the transmitter; and
   b. retransmitting the signal to the receiver.

15. The method of claim 13, further comprising the step of developing a response signal in response to receiving the alarm signal by the receiver.

16. The method of claim 15, wherein the response signal comprises an alarm.

17. A monitoring system comprising:
   a. a sensor to sense a time-varying parameter and to develop an analog signal representative of the parameter, the sensor sealed from flammable gases;
   b. an analog to digital converter to receive the analog signal and convert the analog signal to a digital signal;
   c. a microprocessor to receive the digital signal and to process the digital signal to a transmitter signal;
   d. an intrinsically safe transmitter module activated by the microprocessor and adapted to transmit, upon activation, a monitored signal representative of the parameter or representative of the status of the system;
   e. a receiver to receive the monitored signal from the transmitter.

18. The system of claim 17, wherein the transmitter module includes a battery to operate the analog to digital converter, the microprocessor, and the transmitter.

19. The system of claim 17, wherein the monitored signal comprises a control signal.

20. The system of claim 17, wherein the analog to digital converter, the microprocessor, and the transmitter are sealed within a weather resistant enclosure.

21. The system of claim 17, wherein the passive sensor is coupled to the analog to digital converter by a wire which penetrates the enclosure.

* * * * *